United States Patent
Fujii

(10) Patent No.: US 7,570,960 B2
(45) Date of Patent: Aug. 4, 2009

(54) MOBILE TERMINAL, POSITION SEARCH SYSTEM, POSITION SEARCH METHOD, AND PROGRAM THEREFOR

(75) Inventor: Tomohiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 1463 days.

(21) Appl. No.: 10/188,116

(22) Filed: Jul. 3, 2002

(65) Prior Publication Data
US 2003/0008672 A1   Jan. 9, 2003

(30) Foreign Application Priority Data
Jul. 9, 2001   (JP)   .............................. 2001-207790

(51) Int. Cl.
*H04W 24/00*   (2006.01)
(52) U.S. Cl. ................. 455/456.2; 455/411; 455/404.2; 340/539.13
(58) Field of Classification Search .......... 455/456.1–2, 455/457, 414.1, 404.1, 410–411, 558, 419, 455/404.2; 342/357.07, 457; 379/45, 142.1; 340/539.13
See application file for complete search history.

(56) References Cited

U.S. PATENT DOCUMENTS

| | | | | |
|---|---|---|---|---|
| 5,033,076 A | * | 7/1991 | Jones et al. .................. 379/88.2 |
| 5,809,424 A | * | 9/1998 | Eizenhoefer ............. 455/456.2 |
| 5,960,341 A | * | 9/1999 | LeBlanc et al. .......... 455/426.1 |
| 6,049,718 A | * | 4/2000 | Stewart .................... 455/456.4 |
| 6,067,457 A | * | 5/2000 | Erickson et al. ............. 455/512 |
| 6,078,818 A | * | 6/2000 | Kingdon et al. .......... 455/456.5 |
| 6,112,101 A | * | 8/2000 | Bhatia et al. ................. 455/512 |
| 6,138,003 A | * | 10/2000 | Kingdon et al. ............. 455/410 |
| 6,311,069 B1 | * | 10/2001 | Havinis et al. ........... 455/456.4 |
| 6,317,604 B1 | * | 11/2001 | Kovach et al. ........... 455/456.5 |
| 6,334,059 B1 | * | 12/2001 | Stilp et al. ............... 455/404.2 |
| 6,360,102 B1 | * | 3/2002 | Havinis et al. .............. 455/457 |
| 6,385,458 B1 | * | 5/2002 | Papadimitriou et al. .. 455/456.2 |
| 6,456,852 B2 | * | 9/2002 | Bar et al. .................. 455/456.1 |
| 6,505,048 B1 | * | 1/2003 | Moles et al. ............. 455/456.1 |
| 6,542,819 B1 | * | 4/2003 | Kovacs et al. ................ 701/213 |

(Continued)

FOREIGN PATENT DOCUMENTS

EP    1 168 181 A2    1/2002

(Continued)

OTHER PUBLICATIONS

Great Britain Search Report dated Dec. 7, 2002.

*Primary Examiner*—Sharad Rampuria
(74) *Attorney, Agent, or Firm*—Whitham Curtis Christofferson & Cook, PC

(57) ABSTRACT

A mobile terminal 100 includes a position information detection part 8 that detects current position information, a position information decoder part 9 that calculates the current position information as latitude/longitude information, and a position accuracy degradation-producing part 10 that degrades the apparent accuracy of the latitude/longitude information in plural levels. In operation, when a position search request is made from a third-person terminal, the mobile terminal 100 transmits position information with an accuracy according to the authentication result (such as the result of password verification) of the third-person terminal concerned. Therefore, even when the password has been stolen, position information with an accuracy intentionally degraded by the user of the mobile terminal can be transmitted, thereby preventing an inversion of privacy or stalking.

31 Claims, 12 Drawing Sheets

U.S. PATENT DOCUMENTS

| | | | | |
|---|---|---|---|---|
| 6,643,516 B1 * | 11/2003 | Stewart | ................... | 455/456.6 |
| 6,662,014 B1 * | 12/2003 | Walsh | ................... | 455/456.2 |
| 6,662,023 B1 * | 12/2003 | Helle | ................... | 455/558 |
| 6,687,504 B1 * | 2/2004 | Raith | ................... | 455/456.1 |
| 6,687,505 B1 * | 2/2004 | Hagebarth | ................... | 455/456.2 |
| 6,748,226 B1 * | 6/2004 | Wortham | ................... | 455/456.6 |
| 6,799,032 B2 * | 9/2004 | McDonnell et al. | ................... | 455/410 |
| 6,810,325 B2 * | 10/2004 | Amano et al. | ................... | 701/207 |
| 7,096,029 B1 * | 8/2006 | Parupudi et al. | ................... | 455/456.1 |
| 2001/0030623 A1 | 10/2001 | Shimada et al. | | |
| 2001/0055975 A1 * | 12/2001 | McDonnell et al. | ................... | 455/456 |
| 2003/0146871 A1 * | 8/2003 | Karr et al. | ................... | 342/457 |
| 2004/0078140 A1 * | 4/2004 | Rowitch et al. | ................... | 701/213 |
| 2004/0106415 A1 * | 6/2004 | Maeda et al. | ................... | 455/456.1 |
| 2004/0180669 A1 * | 9/2004 | Kall | ................... | 455/456.1 |

FOREIGN PATENT DOCUMENTS

| | | |
|---|---|---|
| GB | 2 362 249 A | 11/2001 |
| JP | 4183135 | 6/1992 |

* cited by examiner

MOBILE TERMINAL, POSITION SEARCH SYSTEM, POSITION SEARCH METHOD, AND PROGRAM THEREFOR

BACKGROUND OF THE INVENTION

1. Field of the Invention

The present invention relates to a mobile terminal, a position search system, a position search method, and a program therefor, and more particularly, to a mobile terminal, a position search system, a position search method, and a program therefor, all of which are used when a third person conducts a position information search through a communication line.

2. Description of the Related Art

Methods using GPS (Global Positioning System) are known as conventional position-detecting capabilities. Because GPS Selective Availability (SA), that is, the intentional degradation of the GPS signals was removed in May 2000, the methods using GPS have been allowed to conduct position searches as positioning results with accuracies ranging from several meters to tens of meters. In position search services using base stations for cellular phones, it has also been considered how to improve the accuracy of position search.

Such position search services using positioning techniques include third-party search service that allows a user to retrieve or confirm the location of another person or third person in addition to the location of the user himself or herself. Using the third-party search service, if a position search is requested from a third person, authentication information such as a password will be generally verified so that only the search requests from the person or persons who were allowed by the user to conduct the searches (that is, who were informed by the user of the password) can be honored.

However, a malicious or ill-willed person may steal the password used for position search, or hide in a user's bag or the like a mobile terminal with position-detecting capability that is not the property of the user. In such a case, the above-mentioned position search service allows the malicious person to monitor the activities of the user, causing a problem of putting the user at risk of being a victim of a more serious crime such as an inversion of privacy or stalking.

In view of such a problem, the conventional position information search service limits its choice to either the option of denying the position search request from the third person according to the settings preset by the user regardless of the attributes of the position information requesting side, or the option of transmitting data as it is or after processed when transmitting current position information. Such service contents would wipe out close to half of its value as intended position search service. Here, the "attributes of the requesting side" are to tell family members or familiar others from a third person who might bear ill will toward the user.

SUMMARY OF THE INVENTION

The present invention has been made in consideration of the above-mentioned problem, and it is an object thereof to provide a mobile terminal, a position search system, a position search method, and a program therefor, all of which can prevent abuse of the position search service in response to a position search request from a malicious third person, which could result in an inversion of privacy such as to leak personal information or stalking.

It is another object of the present invention to provide a mobile terminal, a position search system, a position search method, and a program therefor, all of which realize position search with the highest accuracy at the time of an emergency call.

In attaining the above two objects, the present invention assumes the following configuration including:

a detection circuit that detects position information; a degradation circuit that degrades the position information obtained by the detection circuit in plural levels of accuracy; an authentication circuit that authenticates the validity of a third-person terminal in response to a position search request from the third-person terminal; and a transmission circuit that sends the third-person terminal the position information with an accuracy determined according to the authentication result by the authentication circuit.

In one preferred embodiment, a setting circuit is so provided that it sets authentication information for each of the levels of accuracy with which the position information has been degraded by the degradation circuit. In this configuration, the authentication circuit compares authentication information transmitted from the third-person terminal with authentication information set by the setting circuit for each of the levels of accuracy of the position information to determine if they match with each other. If the authentication circuit determines that both authentication results do not match, it may be notified that the position search request from the third-person terminal is not permitted.

DETAILED DESCRIPTION OF THE PREFERRED EMBODIMENTS

A mobile terminal, a position search system, a position search method, and a program therefor according to embodiments of the present invention will now be described in detail with reference to the accompanying drawings.

FIGS. 1 through 11 illustrate details of a mobile terminal, a position search system, and a position search method, and a program therefor according to the present invention.

Figure 1:
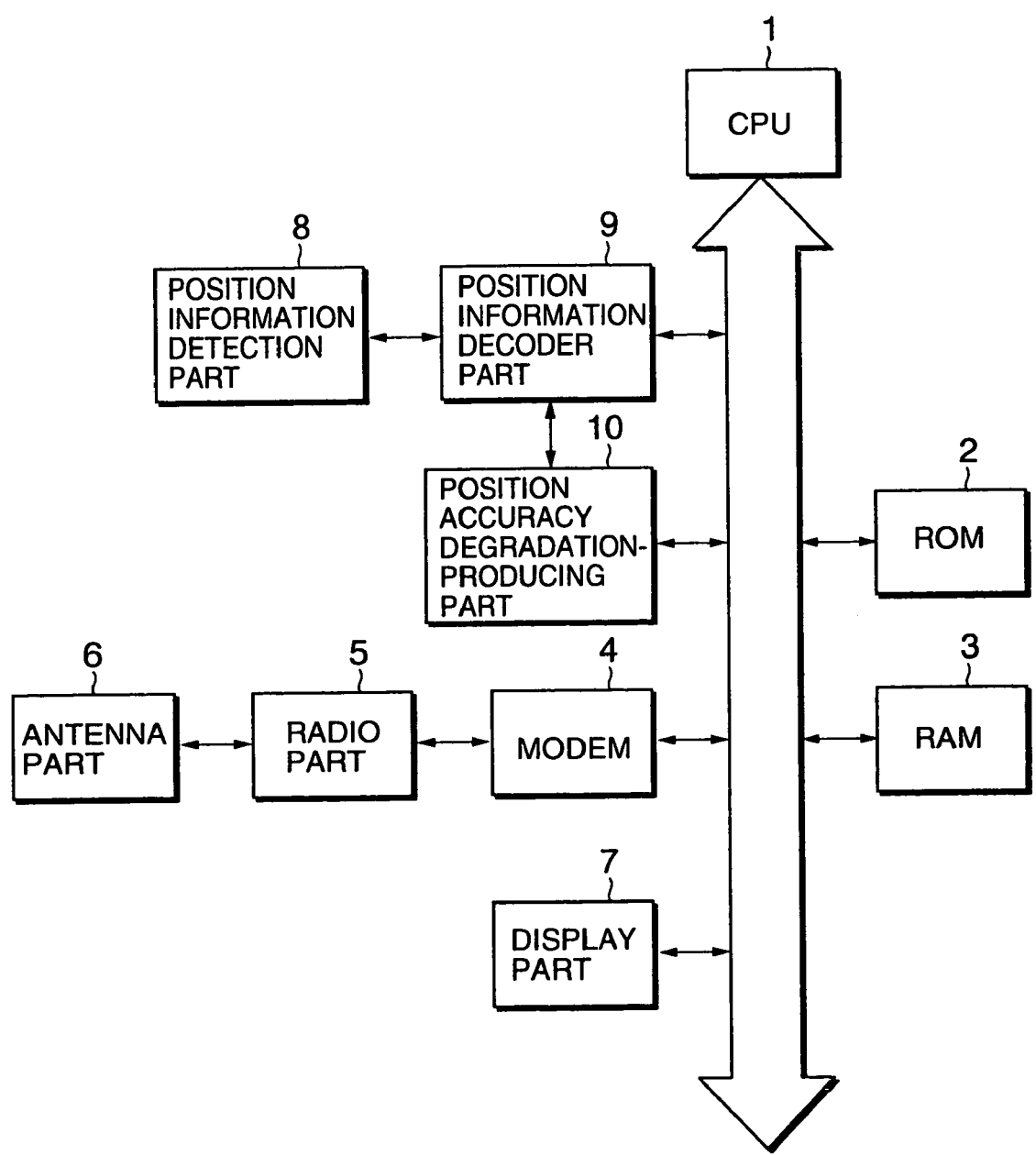
FIG. 1 is a block diagram showing a schematic configuration of a mobile terminal according to embodiments of the present invention.

FIG. 1 is a block diagram showing a schematic configuration of a mobile terminal according to embodiments of the present invention. In FIG. 1, a mobile terminal 100 includes a CPU 1, a ROM 2, a RAM 3, a modem 4, a radio part 5, an antenna part 6, a display part 7, a position information detection part 8, a position information decoder part 9, and a position accuracy degradation-producing part 10.

The CPU 1 controls the entire operation of the mobile terminal 100 according to a program stored in the ROM 2, such as communication control (the modem 4, the radio part 5, and the antenna part 6), display control (the display part 7), position search control (the position information detection part 8, the position information decoder part 9, and the position accuracy degradation-producing part 10).

The ROM 2 is a memory in which the program used by the CPU 1 controlling the operation of the mobile terminal 100 is statically stored. The designer may use as the ROM 2 a flash ROM or EEPROM that can hold data with no or much less power. In the specification, it is assumed that a writable memory device such as a flash ROM is used as the ROM 2.

The RAM 3 is a work area used when the CPU 1 executes the program read from the ROM 2.

The modem 4 and the radio part 5 use a mobile communication network through the antenna part 6 to perform processing such as the reception of a search request from a third person and the transmission of current position information.

The position information detection part 8 uses the GPS capability to detect current position information indicative of the current location of the mobile terminal 100 itself and transfer the detected current position information to the position information decoder part 9. The position information decoder part 9 calculates latitude/longitude information from the current position information transferred from the position information detection part 8. Then the position information decoder part 9 notifies the CPU 1 of the latitude/longitude information calculated.

The CPU 1 instructs the display part 7 to display the position information (the latitude/longitude information) calculated in the position information decoder part 9 as the current latitude and longitude, address, map information, and the like. When the current address or map information is to be displayed in the display part 7, text data on the address or map information corresponding to the latitude and longitude may be prestored in the ROM 2 so that the data will be read out at timing of the display. Alternatively, the data may be downloaded from another server or database through the mobile communication network.

The position accuracy degradation-producing part 10 produces plural pieces of latitude/longitude information whose accuracies are degraded in plural levels arbitrarily preset, and notifies the CPU 1 of the plural pieces of latitude/longitude information.

When the mobile terminal 100 as practiced in the embodiments of the present invention receives a position information search request from a third person, position information selected by the user is transmitted through the modem 4, the radio part 5, and the antenna part 6 in accordance with instructions from the CPU 1.

Figure 2:
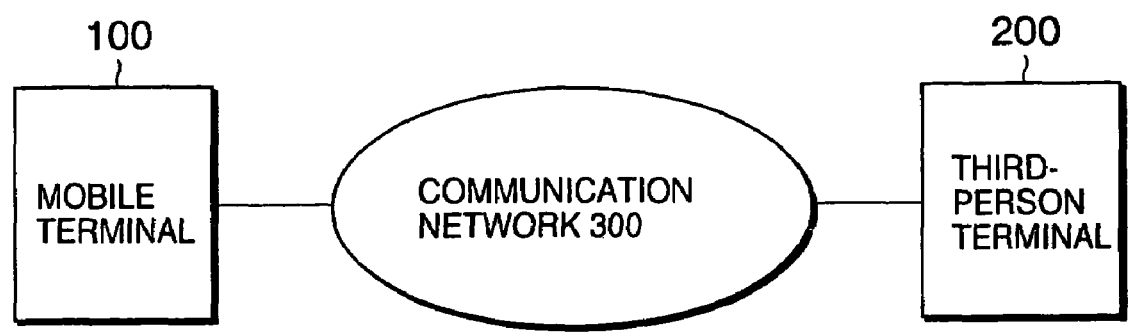
FIG. 2 is a block diagram showing a schematic configuration of a position search system according to an embodiment of the present invention.

FIG. 2 is a block diagram showing a schematic configuration of a position search system according to an embodiment of the present invention. In FIG. 2, the position search system according to the embodiment of the present invention is such that the above-mentioned mobile terminal 100 is connected through a communication network 300 to a third-person terminal 200 used for third-party search.

First Embodiment

Figure 3:
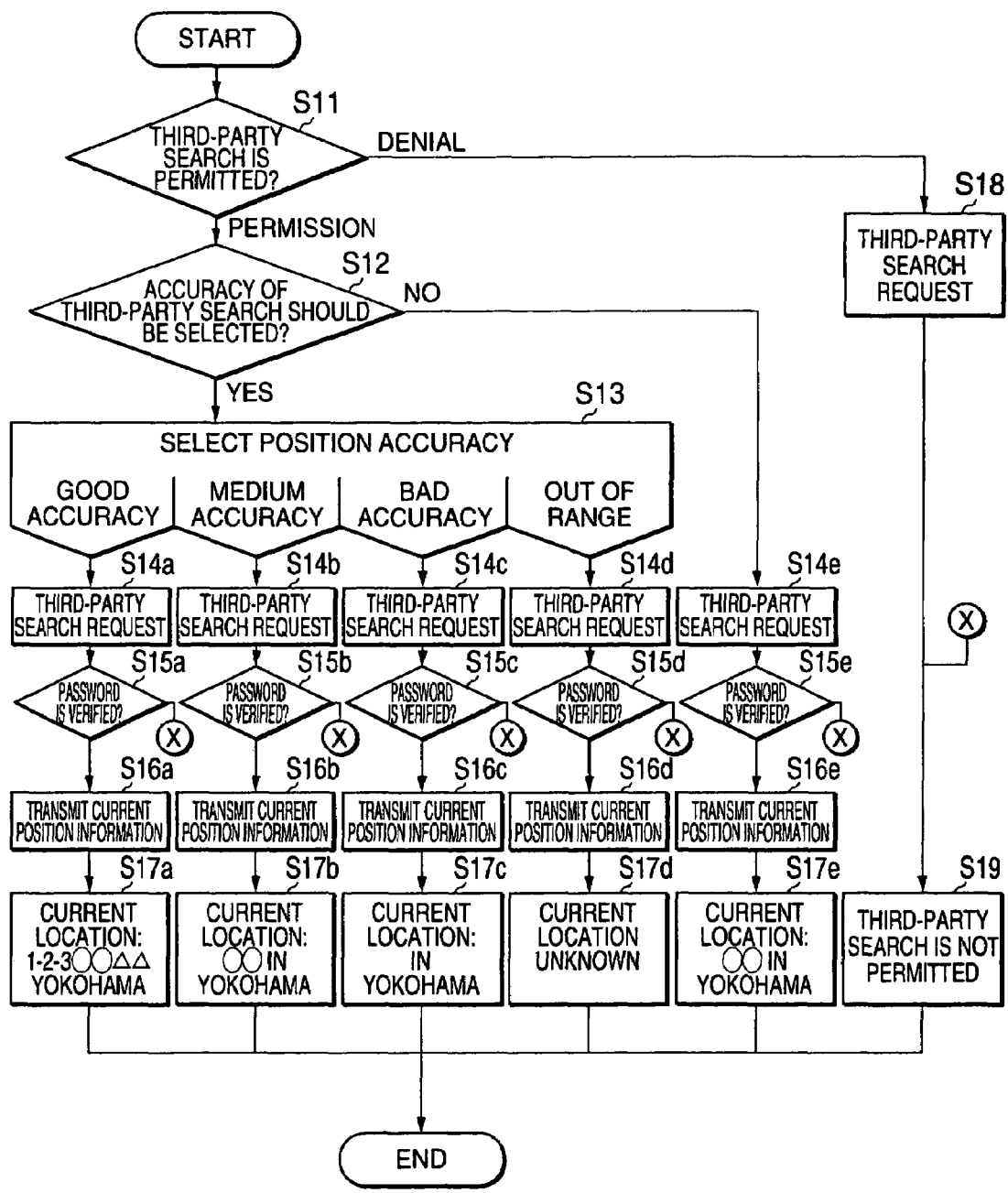
FIG. 3 is a flowchart showing the operation of the mobile terminal according to a first embodiment of the present invention.

FIG. 3 is a flowchart showing the operation of the mobile terminal in the position search system according to the first embodiment of the present invention.

First, the user of the mobile terminal 100 sets whether to permit a third person to conduct a position search, that is, whether to honor the search request from the third person terminal 200 (step S11). In step S11, information on whether to honor the search request from the third-person terminal 200 is stored in the RAM 3 or ROM 2 through the CPU 1.

In step S11, when the search request from the third-person terminal 200 is not permitted (Denial in step S11), even if any search request has been made (step S18), the mobile terminal 100 notifies the third-person terminal 200 that the third person is not permitted to conduct a position search (step S19), and ends the processing.

In step S11, when the mobile terminal 100 honors the search request from the third-person terminal 200 (Permission in step S11), the CPU 1 sets whether to select one of levels of accuracy of position information to be transmitted to the third-person terminal 200 (step S12).

In step S12, if the CPU 1 sets that the mobile terminal 100 selects one of levels of accuracy of position information to be transmitted (Yes in step S12), one of levels of accuracy of position information to be transmitted to the third-person terminal 200 is selected (step S13).

In step S13, although the number of choices of position accuracies is provisionally set to four levels (good accuracy, medium accuracy, bad accuracy, and out of range), any number of choices can be set and it is not limited to four levels.

Suppose that the "good accuracy" is selected in step S13. In this case, when a position search request is made from the third-person terminal 200 (step S14a), a password that has been already notified to the third person who is permitted to conduct a search is verified (step S15a), and the current position information is transmitted (step S16a). In this transmission processing, the CPU 1 transmits to the third-person terminal 200 position information with the highest accuracy. The position information with the highest accuracy may be address information containing a house number like "1-2-3 ○○△△ Yokohama" as shown in step 17a.

Suppose that the "medium accuracy" is selected in step S13. In this case, when a position search request is made from the third-person terminal 200 (step S14b), the password that has been already notified to the third person who is permitted to conduct a search is verified (step S15b), and the current position information is transmitted (step S16b). In this transmission processing, the CPU 1 transmits to the third-person terminal 200 position information with a low degree of abstraction. The position information with the low degree of abstraction may be address information without a house number like "○○ in Yokohama" as shown in step 17b.

Suppose further that the "bad accuracy" is selected in step S13. In this case, when a position search request is made from the third-person terminal 200 (step S14c), the password that has been already notified to the third person who is permitted to conduct a search is verified (step S15c), and the current position information is transmitted (step S16c). In this transmission processing, the CPU 1 transmits to the third-person terminal 200 position information with a high degree of abstraction. The position information with the high degree of abstraction may be address information indicative of the name of a city, town, or village like "Yokohama" as shown in step 17c.

Suppose further that the "out of range" is selected in step S13. In this case, when a position search request is made from the third-person terminal 200 (step S14d), the password that has been already notified to the third person who is permitted to conduct a search is verified (step S15d), and the CPU 1 transmits information informing the third-person terminal 200 that no position information is provided (step S16d). The information informing that the third-person terminal 200 that no position information is provided may be an indication of "unknown current location" or the like that straddles the presence or absence of the provision of information, or a clear indication of the intent to "refuse provision of position information."

Further, in password verification steps S15a to S15e, if the password is not verified (to X from steps S15a-e), the third-person terminal 200 is informed that the third person is not permitted to conduct the position search (step S19) in the same manner as the case where the third person is not permitted in step S11 to conduct the position search, and the CPU 1 ends the processing.

In the position search system according to the embodiment of the present invention, when a position search request is made from the third-person terminal, the CPU 1 used an address (text data) to make a display of position information (on the user of the mobile terminal) to be searched. However, map information corresponding to the latitude and longitude calculated by the position information decoder part 9 can also be transmitted. For example, FIGS. 4 to 6 show display examples of a screen on the third-person terminal when the position information is transmitted as map information.

Figure 4:
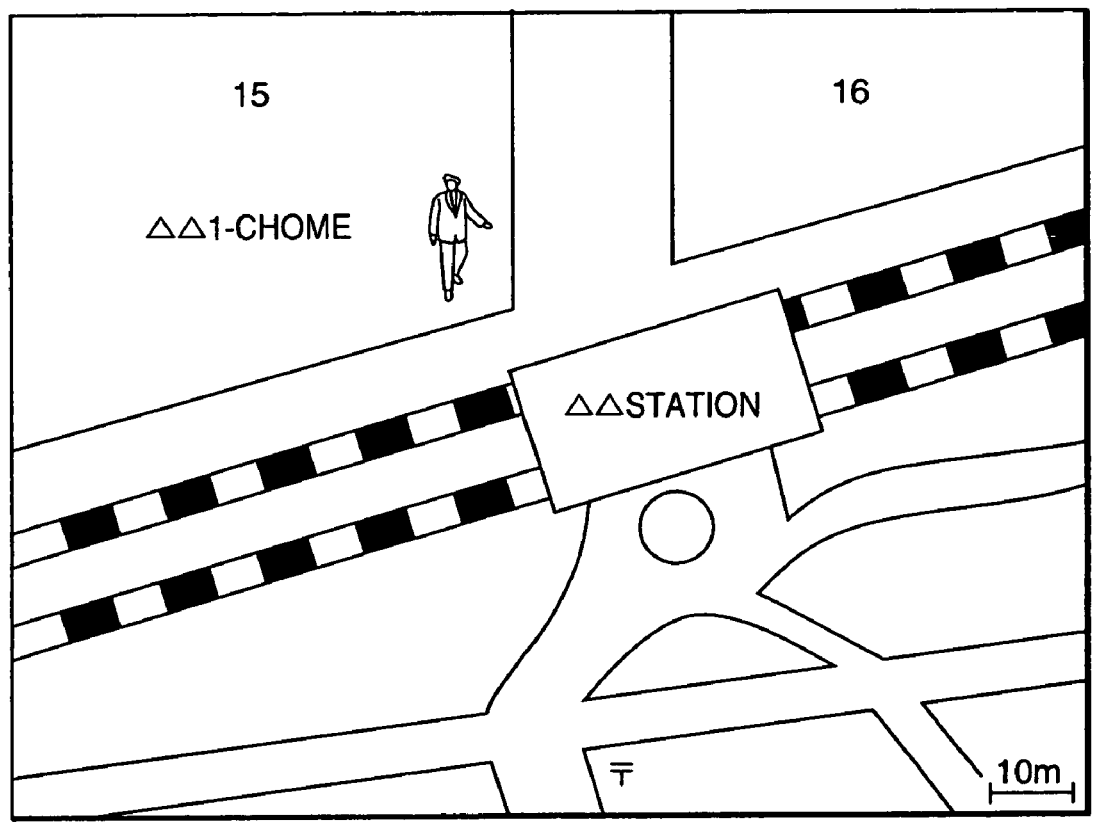
FIG. 4 is a plan view illustrating the display surface of a first screen on a third-person terminal.

FIG. 4 shows an image of image data to be transmitted to the third-person terminal 200 when the user of the mobile terminal 100 selected the "good accuracy." In this case, a detailed map around the above-mentioned address "1-2-3 ○○△△ Yokohama" and data on a marker indicative of the location of the user of the mobile terminal 100 to be searched are transmitted to the third-person terminal 200. Thus the user of the third-person terminal 200 can confirm that the user of the mobile terminal 100 is very close to △△ station in Yokohama.

Figure 5:
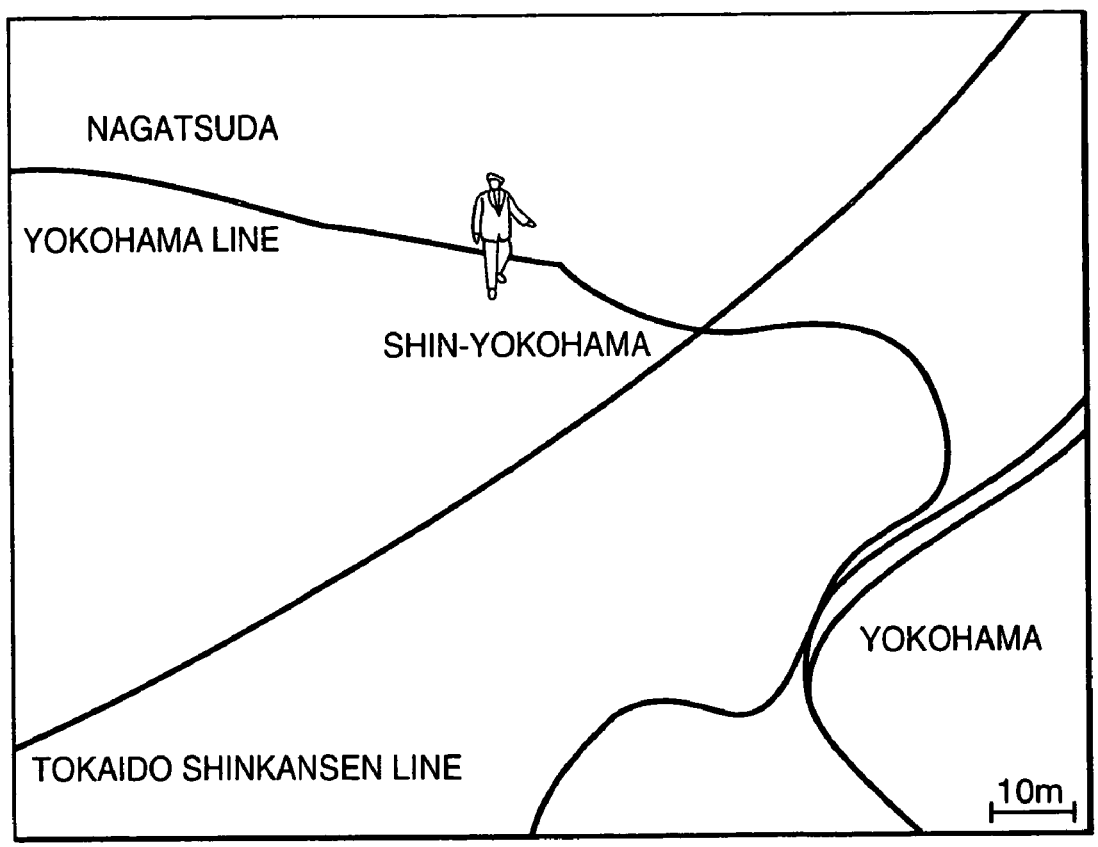
FIG. 5 is a plan view illustrating the display surface of a second screen on the third-person terminal.

FIG. 5 shows an image of transmitted data when the user of the mobile terminal 100 selected the "medium accuracy." In this case, a scale-down map around the above-mentioned address "○○ in Yokohama" and data on a marker indicative of the location of the user of the mobile terminal 100 to be searched are transmitted to the third-person terminal 200. Thus the user of the third-person terminal 200 can confirm that the user of the mobile terminal 100 is within ○○ in Yokohama.

Figure 6:
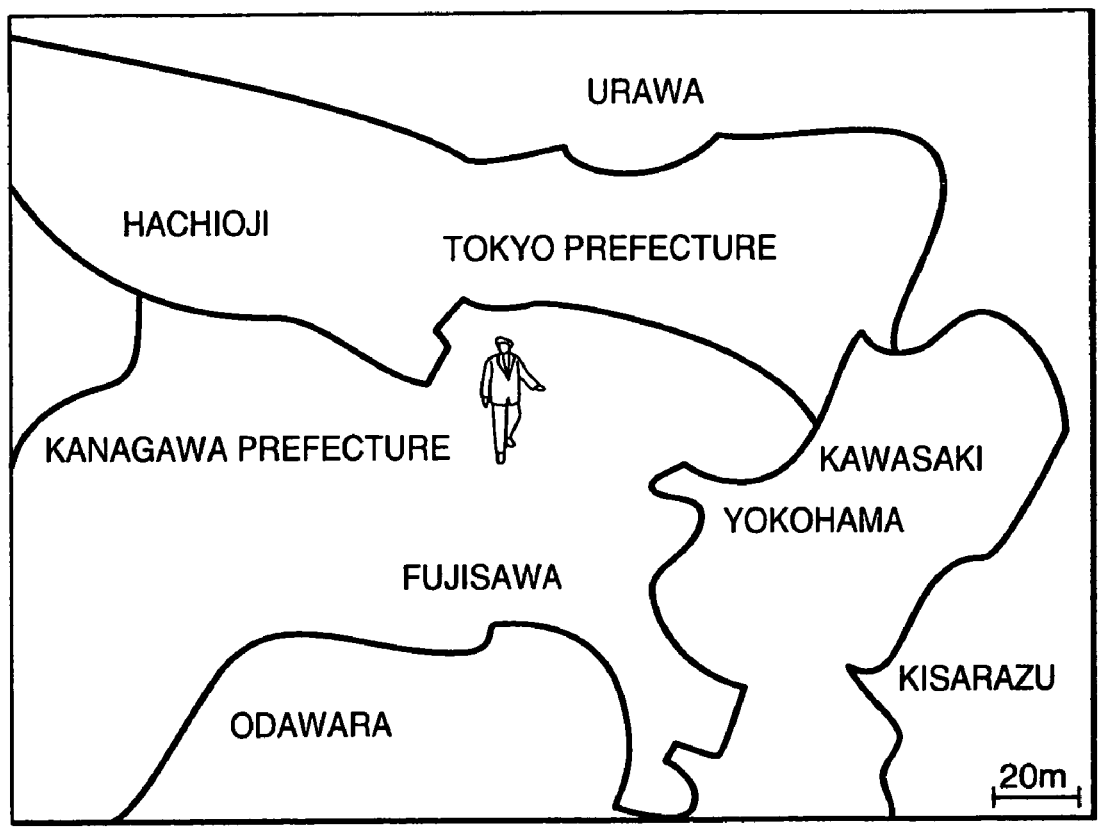
FIG. 6 is a plan view illustrating the display surface of a third screen on the third-person terminal.

FIG. 6 shows an image of transmitted data when the user of the mobile terminal 100 selected the "bad accuracy." In this case, a map including the above-mentioned "Yokohama" city and nearby cities, and data on a marker indicative of the location of the user of the mobile terminal 100 to be searched are transmitted to the third-person terminal 200. Thus the user of the third-person terminal 200 can confirm that the user of the mobile terminal 100 is somewhere around Yokohama.

The display examples of the screen on the third-person terminal shown in FIGS. 4 to 6 vary in height (altitude). A comparison between the good accuracy and bad accuracy shows that it cannot be specified from the screen with the level of bad accuracy exactly where the user of the mobile terminal is. Therefore, an inversion of privacy or stalking caused by third-party search can be prevented.

Further, when degrading the position accuracy, the position accuracy degradation-producing part 10 can change the above-mentioned height (altitude) information. In addition, the position information decoder part 9 can apply an offset preset by the user (for each of plural levels) to the values of the latitude and longitude calculated by the position information decoder part 9.

Second Embodiment

Figure 7:
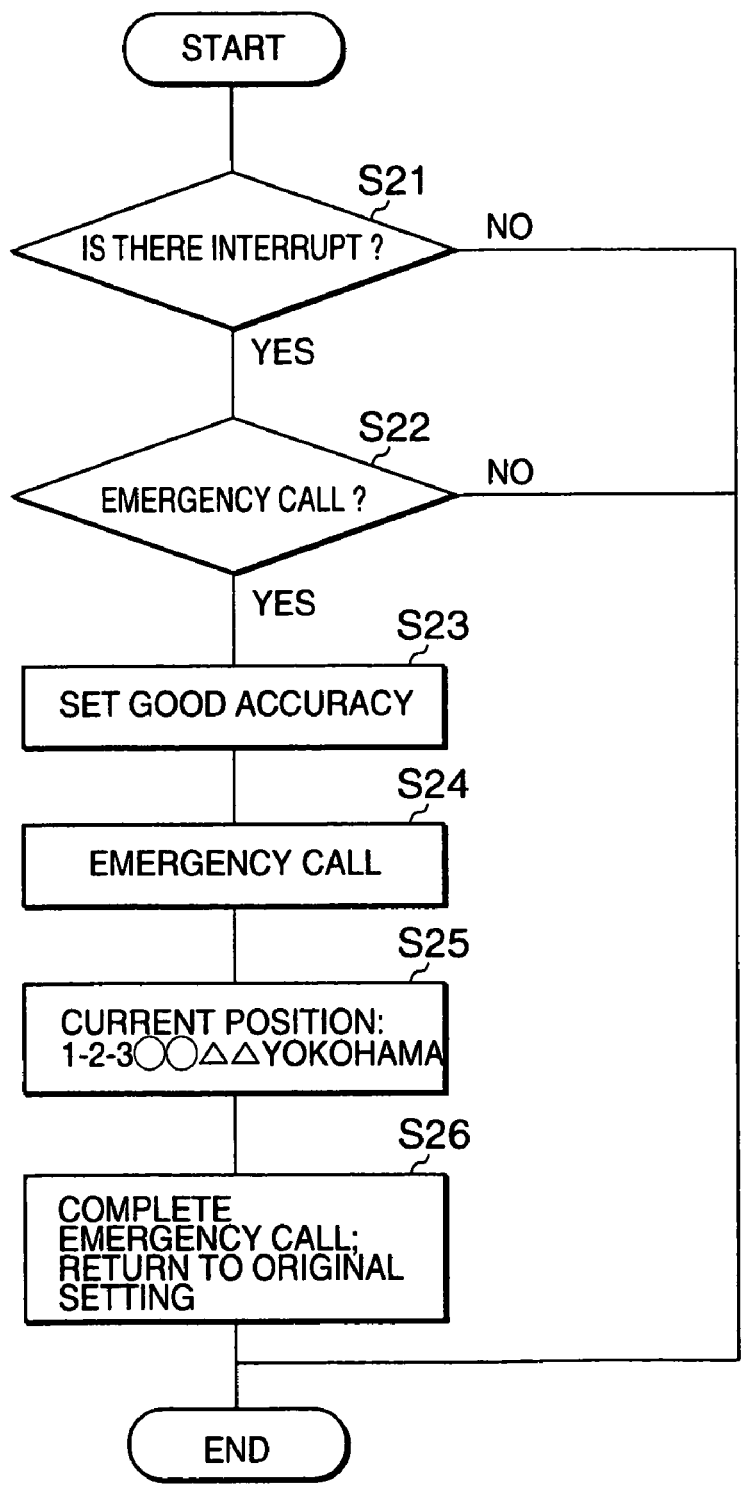
FIG. 7 is a flowchart showing the operation of the mobile terminal according to a second embodiment of the present invention.

FIG. 7 is a flowchart showing the operation of the mobile terminal in the position search system according to the second embodiment of the present invention. In the second embodiment, description will be made about a case where an emergency call (to the police or fire station) is required in such a state that the "bad accuracy" is set for the accuracy of position information to be sent in response to a position search request from the third person. It is assumed that processing shown in FIG. 7 takes place between flows shown in FIG. 3 (in the first processing example).

First, during execution of the processing shown in FIG. 3, the mobile terminal 100 judges whether there is an interrupt request coming in (step S21). If there is no interrupt request coming in (No in step S21), the processing is ended.

In step S21, if there is an interrupt request coming in (Yes in step S21), it is then determined whether the interrupt request is an emergency call (step S22).

If it is not an emergency call (No in step S21), the interrupt processing is ended.

In step S22, if it is an emergency call (Yes in step S22), the position accuracy preset by the user of the mobile terminal 100 is changed from the "bad accuracy" to the "good accuracy" (step S23). Then the emergency call is made (step S24), and current position information with the highest accuracy is notified to the called side to which the emergency call should be made (step S25). After completion of the emergency call, all the settings are returned to the original settings (that is, the "good accuracy" is changed to the "bad accuracy"), and the processing is ended (step S26).

At the time of an emergency call, although the caller is required to inform the called side of the exact location of the caller in real time, the caller may not be able to inform the called side exactly where the caller is because the caller could be in a panic.

According to the second embodiment, even when an emergency call is made in such a state that the "bad accuracy (degraded)" is set for the accuracy of position information to be sent in response to a position search request from the third person, the exact location of the caller can be transmitted in real time without making the user aware of changing the setting of the position accuracy. Further, even when the caller is in a panic, accurate position information can be transmitted to the called side.

Third Embodiment

Figure 8:
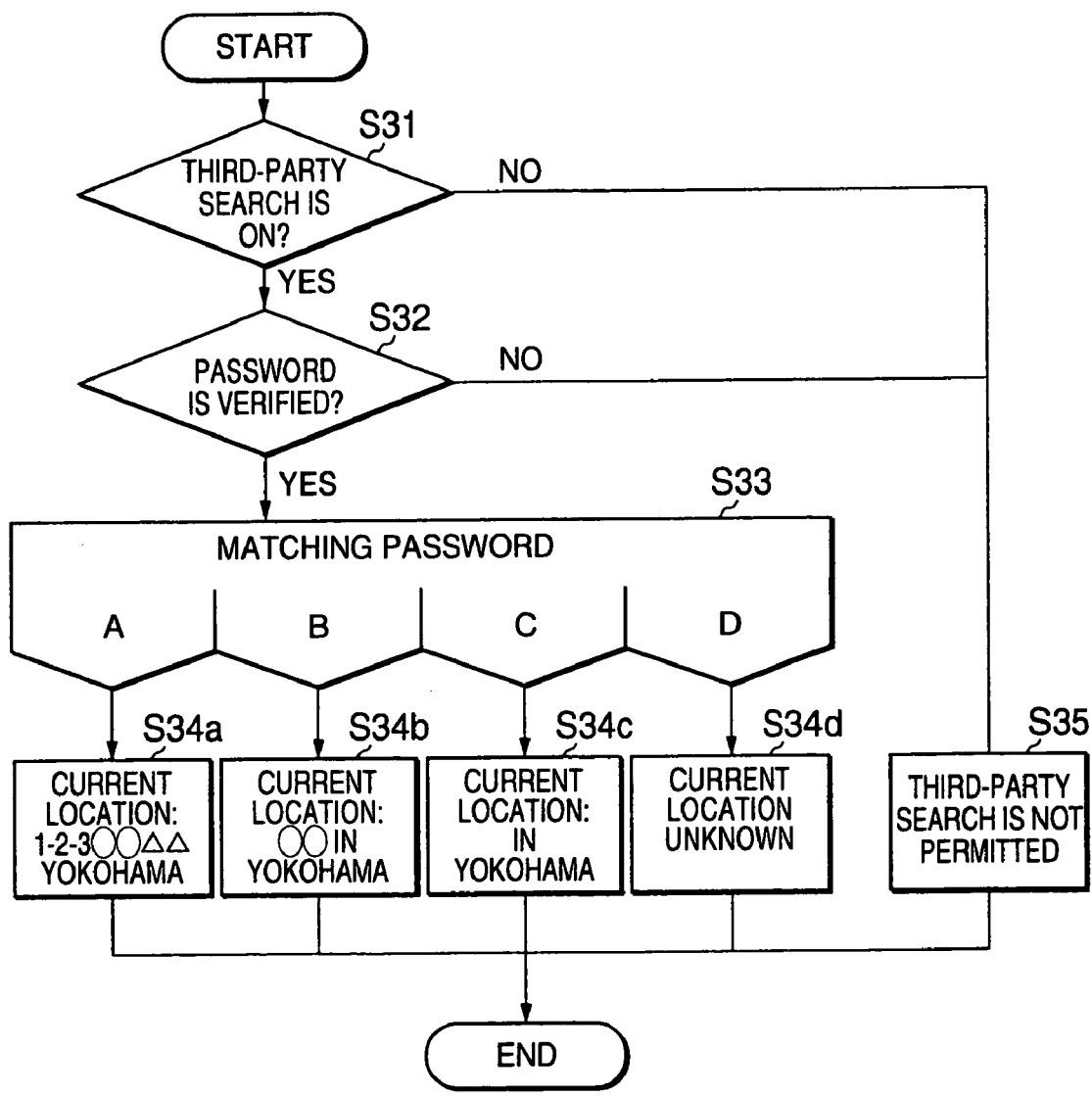
FIG. 8 is a flowchart showing the operation of the mobile terminal according to a third embodiment of the present invention.

FIG. 8 is a flowchart showing the operation of the mobile terminal in the position search system according to the third embodiment of the present invention. In the third embodiment, two or more passwords used for searches to be conducted by third-person terminals are preset based on the premise that the user of the mobile terminal predefines correspondences between position accuracies and searching passwords.

First, when a position search request is made from the third-person terminal 200, the mobile terminal 100 judges whether to honor the position search request, that is, it makes a permission/denial judgment (step S31). If the mobile terminal 100 determines not to honor the position search request from the third-person terminal 200 (Denial in step S31), it notifies the third-person terminal 200 that the search request therefrom is not permitted (step S35), and ends the processing.

In step S31, if the mobile terminal 100 determines to honor the position search request from the third-person terminal 200 (Permission in step S31), it performs verification of a password sent from the third-person terminal 200 (step S32). If the password does not match any of the preset passwords (No in step S32), the mobile terminal 100 notifies the third-person terminal 200 that the search request therefrom is not permitted (step S35), and ends the processing.

In step S32, if the password matches any of the preset passwords (Yes in step S32), the CPU 1 determines which of the passwords preset for respective position accuracies the password concerned matches (step S33).

Suppose here that the "good accuracy" is preset for password A, the "medium accuracy" is preset for password B, the "bad accuracy" is preset for password C, and the "out of range" is preset for password D.

In step S33, if the password is judged to be the password A, position information with the highest accuracy like "1-2-3 ○○△△ Yokohama" as shown in step S34a will be transmitted to the third-person terminal 200.

In step S33, if the password is judged to be the password B, position information with a medium accuracy like "○○ Yokohama" as shown in step S34b will be transmitted to the third-person terminal 200.

In step S33, if the password is judged to be the password C, position information with the lowest accuracy like "Yokohama" as shown in step S34c will be transmitted to the third-person terminal 200.

In step S33, if the password is judged to be the password D, information indicating that the "current position is unknown" will be transmitted to the third-person terminal 200.

According to the third embodiment, several kinds of passwords used for searches to be conducted by third-person terminals are prepared, so that position information with varying position accuracies can be transmitted depending on the person (third person) who was permitted to conduct a position search with a password.

Current position information with a degraded accuracy can be transmitted to unreliable persons, thereby preventing crime or the like. On the other hand, current position information with the best accuracy can be transmitted to reliable persons such as the family members and relatives, thereby transmitting accurate position information even in case of emergency.

Fourth Embodiment

Figure 9:
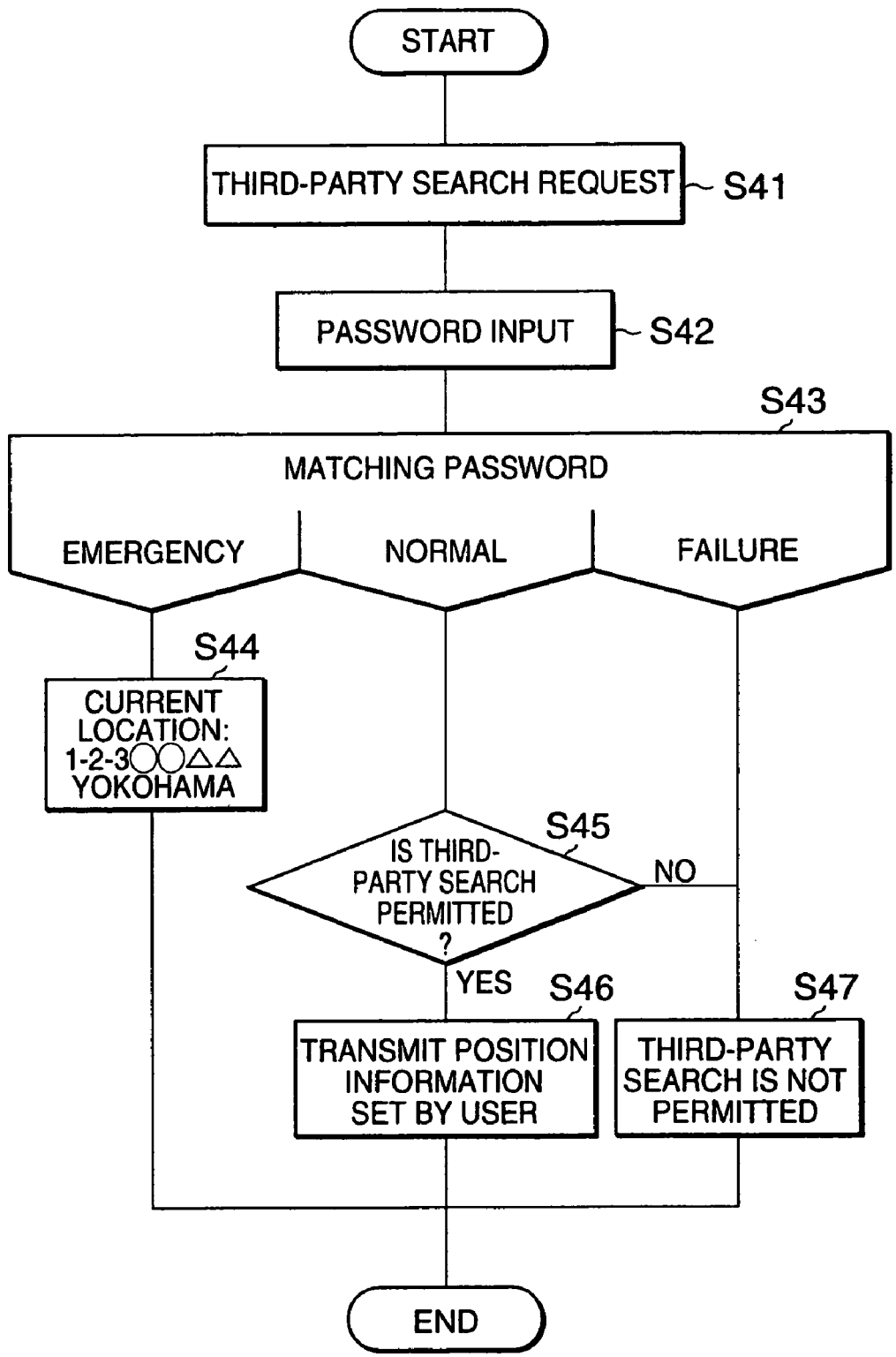
FIG. 9 is a flowchart showing the operation of the mobile terminal according to a fourth embodiment of the present invention.

FIG. 9 is a flowchart showing the operation of the mobile terminal in the position search system according to the fourth embodiment of the present invention. In the fourth embodiment, description will be made about a case where position information with the highest accuracy is required, for example, where the user of the mobile terminal is involved in crime such as kidnapping.

First, the mobile terminal 100 receives a position search request from the third-person terminal 200 (step S41), and receives a searching password input on the side of the third-person terminal 200 (step S42).

The password used in this embodiment differs in characteristic from the searching passwords shown in the above-mentioned embodiments; it is a password closed to the public for emergency purposes. A manufacturer's serial number or ID key number necessary to get an ID number may be used as the password, and since such a number is usually unknown to any other users, the emergency password is at extremely reduced risk of being stolen.

The CPU 1 determines to which category (Emergency/Normal/Failure) the characteristic of the password received in step S42 belongs (step S43).

In step S43, if the CPU 1 determines that the password is for emergency use (Emergency in step S43), current position information with the highest accuracy will be transmitted to the third-person terminal (step S44).

In step S43, if the CPU 1 determines that the password is a normal password (Normal in step S43), the CPU 1 then determines whether to honor the position search request from the third-person terminal (step S45). If the CPU 1 determines to honor the position search request from the third-person terminal (Yes in step S45), the CPU 1 transmits position information based on the position accuracy set by the user of the mobile terminal 100 (step S46).

In step S43, if the CPU 1 fails in password matching (Failure in step S43), or when the CPU 1 determines not to honor the position search request from the third-person terminal (No in step S45), the CPU 1 notifies the third-person terminal that the position search request therefrom is not permitted (step S47), and ends the processing.

According to the fourth embodiment, even if the user of the mobile terminal is involved in crime or the like in such a state that the user has degraded the accuracy with which the current position would be transmitted in response to a position search request from the third-person terminal, the police or phone company can enter the password for emergency use so that the position information of the mobile terminal 100 will be transmitted with the best accuracy.

The above-mentioned embodiments illustrated such a configuration that the mobile terminal located itself by stand alone positioning using GPS, but the method of locating the mobile terminal is not limited thereto. For example, various other methods can be adopted such as relative positioning, network assisted positioning, position detection based on the radio field intensity of a base station, and position detection based on signal arrival time from a base station.

Figure 10:
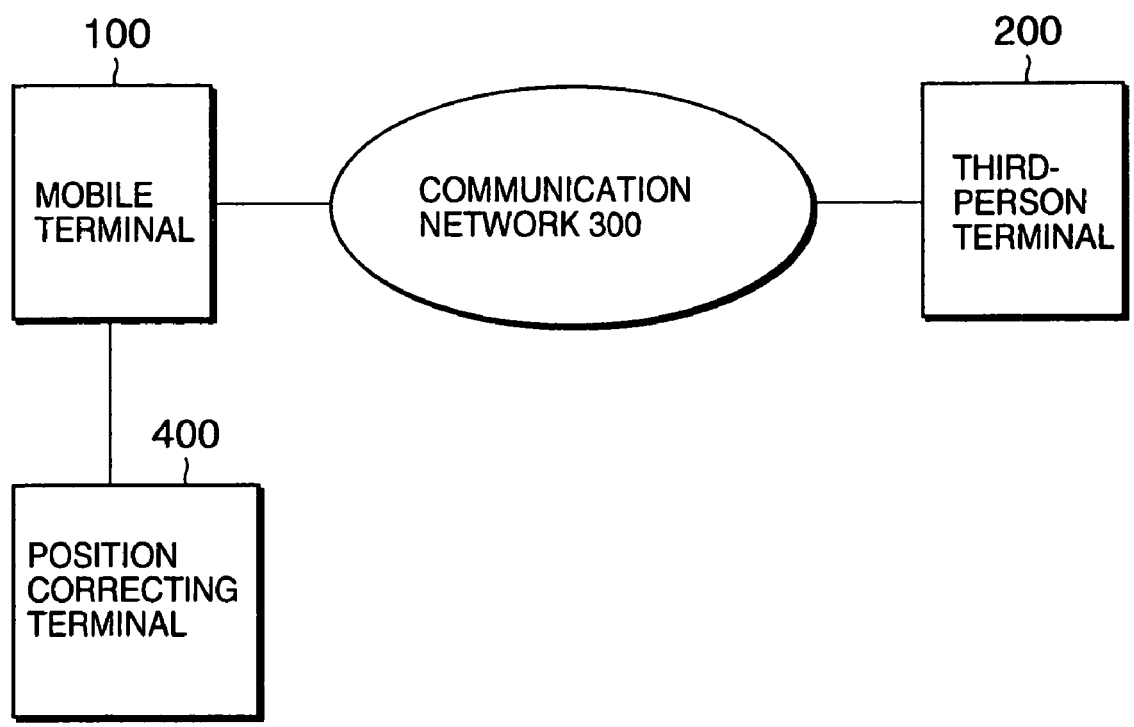
FIG. 10 is a block diagram showing a schematic configuration of a position search system according to another embodiment of the present invention.

FIG. 10 illustrates by an example a case where relative positioning is adopted. In this case, a position correcting terminal 400 is provided for FM-broadcasting correction information on the position information detected by the mobile terminal 100, thereby improving the accuracy of position detection.

Figure 11:
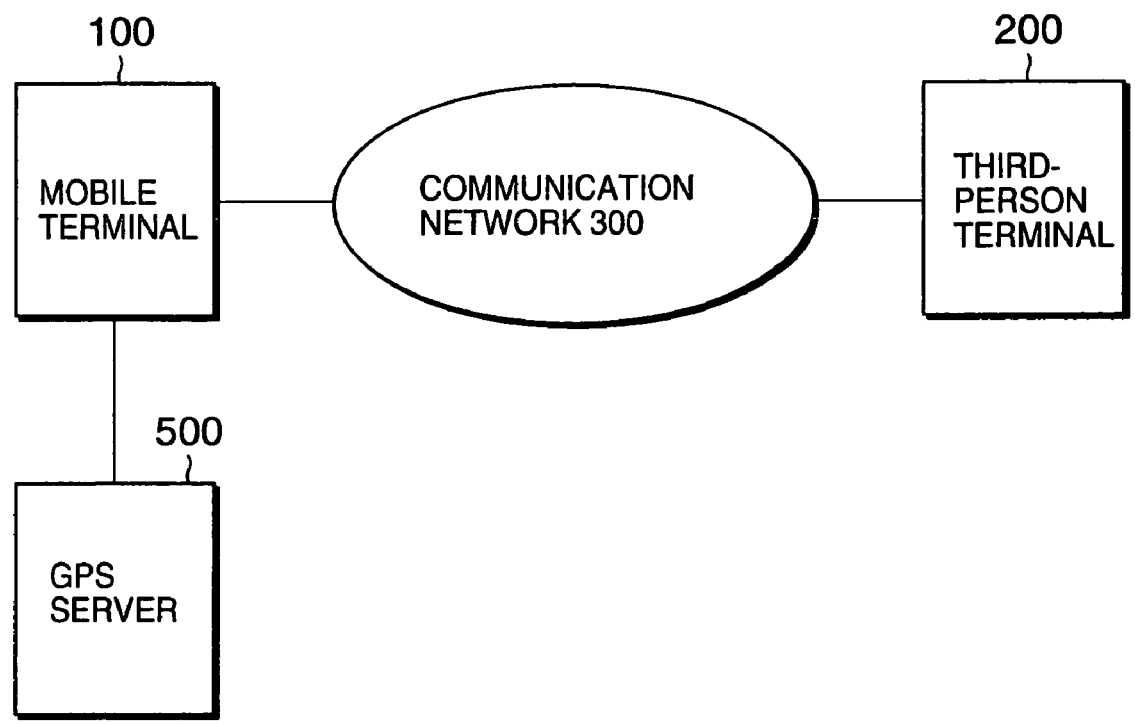
FIG. 11 is a block diagram showing a schematic configuration of a position search system according to still another embodiment of the present invention.

FIG. 11 illustrates by an example a case where network assisted positioning is adopted. In this case, a GPS server 500 can be so provided that the GPS server 500 will perform computations (operations performed by the position information decoder part 9 and the position accuracy degradation-producing part 10) to detect position information instead of the mobile terminal 100 as practiced in the above-mentioned embodiments of the present invention, thereby lightening excessive load on the mobile terminal 100.

Figure 12:
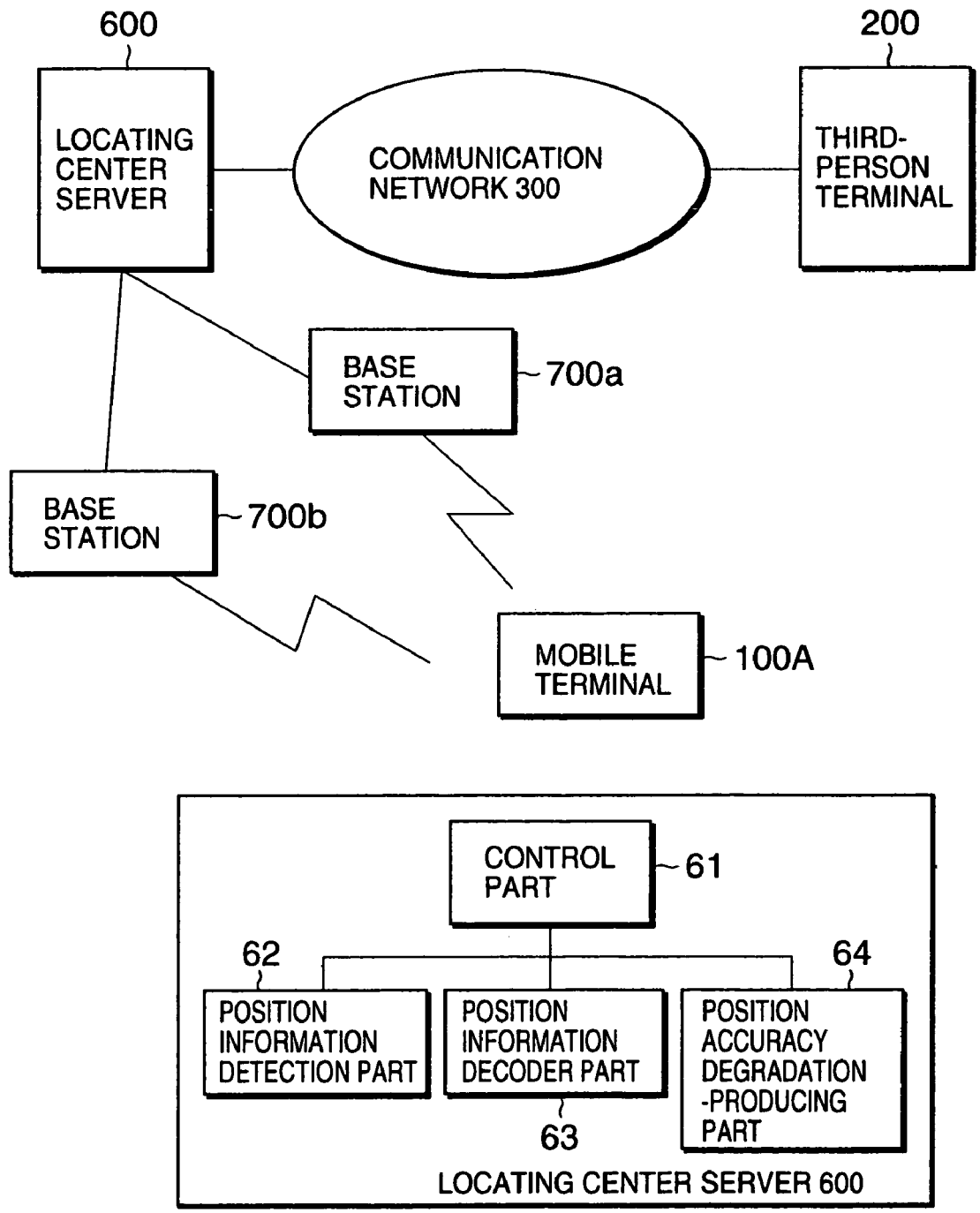
FIG. 12 is a block diagram showing a schematic configuration of a position search system according to yet another embodiment of the present invention.

FIG. 12 illustrates by an example a case where position detection based on the radio field intensity of or signal arrival time from a base station is adopted, that is, where a PHS terminal is used. In this case, a mobile terminal 100A is connected to a locating center server 600 through radio base stations 700a and 700b, while the third-person terminal 200 is connected to the locating center server 600 through the communication network 300. The locating center server 600 includes a control part 61, a position information detection part 62, a position information decoder part 63, and a position accuracy degradation-producing part 64, which perform processing in the same manner as the mobile terminal 100A. Thus, even when a PHS terminal without GPS capability is used, the locating center server undertakes all the functions, so that the same effects can be obtained.

The above-mentioned embodiments are just preferred embodiments, and various modifications can be carried out without departing from the scope or essential characteristics of the present invention. For example, a function for identifying a fingerprint or pupil may be adopted to use the fingerprint or pupil as a password unique to an individual instead of the passwords using typical alpha-numeral characters according to the present invention.

What is claimed is:

1. A mobile terminal comprising:
   detection means that detects position information;
   degradation means that degrades the position information detected by said detection means in plural levels of accuracy;
   authentication means that authenticates the validity of a third-person terminal in response to a position search request from the third-person terminal through a communication network; and
   transmission means that sends the third-person terminal the position information with an accuracy determined according to an authentication result by said authentication means;
   setting means that sets authentication information for each of levels of accuracy with which the position information has been degraded by said degradation means, wherein
   said authentication means compares the authentication information transmitted from the third-person terminal with the authentication information set by said setting means for each of the levels of accuracy of the position information to determine if they match with each other.

2. The mobile terminal according to claim 1, wherein when said authentication means determines that authentication results do not match, said mobile terminal notifies the third-person terminal that the position search request from the third-person terminal is not permitted.

3. The mobile terminal according to claim 1, further comprising detection means for detecting the presence or absence of an emergency request, wherein
   when said detection means detects an emergency call operation, said transmission means transmits, to the request side of the emergency request, position information with the highest accuracy selected from among the accuracies of the position information degraded by said degradation means in the plural levels.

4. The mobile terminal according to claim 1, further comprising registration means that registers authentication information for emergency use, wherein
   when said authentication means authenticates the authentication information transmitted from the third-person terminal as the authentication information for emergency use registered by said registration means, said transmission means transmits the position information with the highest accuracy selected from among the accuracies of the position information degraded by said degradation means in the plural levels.

5. A mobile terminal comprising:
   a detection circuit that detects position information;
   a degradation circuit that degrades the position information detected by said detection circuit in plural levels of accuracy;
   an authentication circuit that authenticates the validity of a third-person terminal in response to a position search request from the third-person terminal through a communication network; and
   a transmission circuit that sends the third-person terminal the position information with an accuracy determined according to the authentication result by said authentication circuit;
   setting circuit that sets authentication information for each of levels of accuracy with which the position information has been degraded by said degradation circuit, wherein
   said authentication circuit compares the authentication information transmitted from the third-person terminal with the authentication information set by said setting circuit for each of the levels of accuracy of the position information to determine if they match with each other.

6. The mobile terminal according to claim 5, wherein when said authentication circuit determines that authentication results do not match, said mobile terminal notifies that the position search request from the third-person terminal is not permitted.

7. The mobile terminal according to claim 5, further comprising detection circuit for detecting the presence or absence of an emergency request, wherein
   when said detection circuit detects an emergency request, said transmission circuit transmits, to a request side of the emergency request, position information with the highest accuracy selected from among the accuracies of the position information degraded by said degradation circuit in the plural levels.

8. The mobile terminal according to claim 5, further comprising registration circuit that registers authentication information for emergency use, wherein
   when said authentication circuit authenticates the authentication information transmitted from the third-person terminal as the authentication information for emergency use registered by said registration circuit, said transmission circuit transmits the position information with the highest accuracy selected from among the accuracies of the position information degraded by said degradation circuit in the plural levels.

9. A position search system in which a mobile terminal is connected to a third-person terminal through a communication network, said third-person terminal including first transmission means that transmits a position search request from its own terminal to said mobile terminal, and
   said mobile terminal including:
   detection means that detects position information;
   degradation means that degrades the position information detected by said detection means in plural levels of accuracy;
   authentication means that authenticates validity of said third-person terminal in response to the position search request from said third-person terminal through said first transmission means; and
   second transmission means that sends said third-person terminal the position information with an accuracy selected from among the plural pieces of the position information degraded by said degradation means in the plural levels, according to an authentication result by said authentication means, wherein said third-person terminal displays the position information with the accuracy determined according to the authentication result transmitted from said second transmission means;

wherein said mobile terminal further includes setting means that sets authentication information for each of the levels of accuracy with which the position information has been degraded by said degradation means, and said authentication means compares the authentication information transmitted from said third-person terminal with the authentication information set by said setting means for each of the levels of accuracy of the position information to determine if they match with each other.

10. The position search system according to claim 9, wherein said mobile terminal further includes detection means for detecting the presence or absence of an emergency request, and when said detection means detects an emergency request, said transmission means transmits, to the request side of the emergency request, position information with the highest accuracy selected from among the accuracies of the position information degraded by said degradation means in the plural levels.

11. The position search system according to claim 9, wherein said mobile terminal further includes registration means that registers authentication information for emergency use, and when said authentication means authenticates the authentication information transmitted from said third-person terminal as the authentication information for emergency use registered by said registration means, said transmission means transmits position information with the highest accuracy selected from among the accuracies of the position information degraded by said degradation means in the plural levels.

12. The position search system according to claim 9, wherein when said authentication means determines that authentication results do not match, said mobile terminal notifies said third-person terminal that the position search request from said third-person terminal is not permitted.

13. A position search method for a position search system in which a mobile terminal is connected to a third-person terminal through a communication network, the third-person terminal including a first transmission step of transmitting a position search request from its own terminal to the mobile terminal, and the mobile terminal performing:

detection step of detecting position information;

degradation step of degrading position information detected in said detection step in plural levels of accuracy;

authentication step of authenticating validity of the third-person terminal in response to the position search request from the third-person terminal through said first transmission step; and a second transmission step of sending the third-person terminal the position information with an accuracy selected from among the plural pieces of position information degraded in said degradation step in the plural levels, according to authentication result in said authentication step, wherein the third-person terminal displays the position information with the accuracy determined according to the authentication result transmitted in said second transmission step;

wherein the mobile terminal further includes a setting step of setting authentication information for each of the levels of accuracy with which the position information has been degraded in said degradation step, and the authentication information transmitted from the third-person terminal is compared in said authentication step with the authentication information set in said setting step for each of the levels of accuracy of the position information to determine if they match with each other.

14. The position search method according to claim 13, wherein the mobile terminal further includes a detection step of detecting the presence or absence of an emergency request, and when an emergency request is detected in said detection step, the position information with the highest accuracy selected from among the accuracies of the position information degraded in said degradation step in the plural levels is transmitted in said transmission step to the request side of the emergency request.

15. The position search method according to claim 13, wherein the mobile terminal further includes a registration step of registering authentication information for emergency use, and when the authentication information transmitted from the third-person terminal is authenticated in said authentication step as the authentication information for emergency use registered in said registration step, position information with the highest accuracy selected from among the accuracies of the position information degraded in said degradation step in the plural levels is transmitted in said transmission step.

16. The position search method according to claim 13, wherein when it is determined in said authentication step that authentication results do not match, the mobile terminal notifies the third-person terminal that the position search request from the third-person terminal is not permitted.

17. A computer readable medium containing instructions for a position search system in which a mobile terminal is connected to a third-person terminal through a communication network, said instructions instructing the third-person terminal to perform first transmission processing for transmitting a position search request from its own terminal to the mobile terminal, and the mobile terminal to perform:

detection processing for detecting position information;

degradation processing degrading the position information detected in said detection processing in plural levels of accuracy;

authentication processing for authenticating the validity of the third-person terminal in response to the position search request from the third-person terminal through said first transmission processing; and second transmission processing for sending the third-person terminal the position information with an accuracy selected from among the plural pieces of position information degraded in said degradation processing in the plural levels, according to authentication result in said authentication processing, wherein the third-person terminal displays the position information with the accuracy determined according to the authentication result transmitted in said second transmission processing;

wherein the mobile terminal is further instructed to perform setting processing for setting authentication information for each of the levels of accuracy with which the position information has been degraded in said degradation processing, and the authentication information transmitted from the third-person terminal is compared in said authentication processing with the authentication information set in said setting processing for each of the levels of accuracy of the position information to determine if they match with each other.

18. The computer readable medium containing instructions for the position search system according to claim 17, wherein the mobile terminal is further instructed to perform detection processing for detecting the presence or absence of an emergency call operation, and when an emergency request is detected in said detection processing, the position information with the highest accuracy selected from among the accuracies of the position information degraded in said degradation processing in the plural levels is transmitted in said transmission processing to a request side of the emergency request.

19. The computer readable medium containing instructions for the position search system according to claim 17, wherein the mobile terminal is further instructed to perform a registration processing for registering authentication information for emergency use, and when the authentication information transmitted from the third-person terminal is authenticated in said authentication processing as the authentication information for emergency use registered in said registration processing, position information with the highest accuracy selected from among the accuracies of the position information degraded in said degradation processing in the plural levels is transmitted in said transmission processing.

20. The computer readable medium containing instructions for the position search system according to claim 17, wherein when it is determined in said authentication processing that authentication results do not match in said authentication processing, the mobile terminal is instructed to perform notification processing for notifying the third-person terminal that the position search request from the third-person terminal is not permitted.

21. A mobile terminal as recited in claim 1 wherein said authentication means authenticates at least a plurality of third person terminals.

22. A mobile terminal as recited in claim 5 wherein said authentication circuit authenticates at least a plurality of third person terminals.

23. A position search system as recited in claim 9 wherein said authentication means authenticates at least a plurality of third person terminals.

24. The mobile terminal of claim 1 wherein said plural levels of accuracy include a highest accuracy level and one or more additional accuracy levels each of which are of a lower accuracy than said highest accuracy level for the position information detected by said detection means.

25. The mobile terminal of claim 5 wherein said plural levels of accuracy include a highest accuracy level and one or more additional accuracy levels each of which are of a lower accuracy than said highest accuracy level for the position information detected by said detection circuit.

26. The position search system of claim 9 wherein said plural levels of accuracy produced by said degradation means include a highest accuracy level and one or more additional accuracy levels each of which are of a lower accuracy than said highest accuracy level for the position information detected by said detection means.

27. The method of claim 13 wherein said plural levels of accuracy produced by said degradation step include a highest accuracy level and one or more additional accuracy levels each of which are of a lower accuracy than said highest accuracy level for the position information detected in said detecting step.

28. The mobile terminal of claim 1 wherein said authentication means utilizes a password.

29. The mobile terminal of claim 5 wherein authentication circuit operates based on a password..

30. The position search system of claim 9 wherein said authentication means in said mobile terminal utilizes a password.

31. The position search method recited in claim 13 wherein said authentication step includes the use of a password.

* * * * *